United States Patent Office 2,924,581
Patented Feb. 9, 1960

2,924,581

CELLULAR POLYURETHANE RESINS AND PREPARATION OF SAME

Abraham Bavley, Brooklyn, Charles J. Knuth, Flushing, and Albert E. Timreck, Forest Hills, N.Y., assignors to Chas. Pfizer & Co., Inc., New York, N.Y., a corporation of Delaware No Drawing. Application October 1, 1957
Serial No. 687,360

6 Claims. (Cl. 260—2.5)

This invention is concerned with polyurethane foam compositions of improved and unique properties. It is more particularly concerned with improved polyurethane flexible foam compositions which are resistant to color change and possess enhanced stability to conditions of high humidity and novel and valuable compression-deflection characteristics. It also is concerned with the process of producing the improved polyurethane foams.

Polyurethane foams are well known commercial products of varied utility. For instance, these foams are useful in the manufacture of cushions for furniture mattresses, and other well known flexible products, in which soft foams generally are employed. Another use of these foams is as safety padding for dash boards in automobiles.

The polyurethane foams have usually been prepared from polyester resins and organic isocyanates. The polyesters are obtained by the interaction of polyols and polycarboxylic acids preferably dicarboxylic acids such as adipic, pimelic, azelaic, sebacic acid and others. The preferred polyols are glycols, for example, ethylene glycol and diethylene glycol and triols, for example, glycerine and others.

Polyurethane foams are subject to limitations in their use because of a number of undesirable properties. For example, these foams are subject to considerable discoloration upon aging. In addition, the foams are subject to degradation and loss of strength upon prolonged exposure to high humidity. Further, with most polyurethane foams the ratio of compressive load to percent deflection does not approximate a constant value. As the load is increased, a point is reached where the foam compresses unusually rapidly. The sudden collapse detracts from the desirability of such foams in upholstery applications.

It has now been found that the compositions of this invention are not subject to the above mentioned deficiencies. The compositions of this invention have greatly improved color stability as evidenced by the lack of any appreciable discoloration after storage for long periods of time, for example, 3 to 4 months. In contrast to this behavior, polyurethane foams prepared in accordance with the art as heretofore known using commercial polyesters frequently develop yellow to yellow-brown color from within a few hours to a few days. The foam compositions of this invention also resist degradation upon exposure to high humidity to a greater extent than do polyester urethane foams heretofore known. A third most outstanding property of the compositions of this invention is the improved compression-deflection behavior as stated above. Most polyurethane foams do not respond uniformly to compression but after initial resistance collapse rather suddenly as the compression load is increased. The compositions of this invention show a much more uniform compression to load ratio. These are stronger and stiffer for a given density than those obtained with commercially available polyesters. These properties make the present compositions much more desirable for use in many commercial products, for example, in furniture cushions and mattresses.

The polyurethane foam compositions of this invention are obtained by reacting an organic diisocyanate with a polyester containing reactive double bonds introduced into the polyester by incorporating varying quantities of itaconic acid. The usual method of preparing such foams, as is well known to the art, is to react the polyester and the diisocyanate in the presence of water. The function of the water is to release carbon dioxide on reacting with a portion of the diisocyanate. The carbon dioxide is directly responsible for the foaming of the reaction mixture which eventually results in the desired physical state of the product. To ensure uniform distribution of the water throughout the reaction mass, an emulsifying agent, for example, polyoxyethylated vegetable oils, such as Emulphor, EL 719 (Antara, Sales Division of General Aniline & Film Corp.) or other emulsifier is usually added to further ensure the production of a uniform foam. As is commonly known in the art, for best results, it is desirable to add a catalyst for the polyurethane formation. The most common catalysts are tertiary amines, such as N-alkyl morpholines, triethylamine, dimethylbenzylamine and others. The polyesters employed in the foam compositions of this invention are prepared from itaconic acid and at least one other dicarboxylic acid together with glycols such as ethylene glycol, propylene glycol, diethylene glycol, pentamethylene glycol, hexamethylene glycol, triethylene glycol and the like. Mixtures of glycols may also be employed. The preferred organic diisocyanate for reaction with the polyester is a tolylene diisocyanate such as 2,4-tolylene diisocyanate or 2,6-tolylene diisocyanate or mixtures thereof. Other organic diisocyanates may be employed, for example, paraphenylene diisocyanate, metaphenylene diisocyanate and others. Aliphatic diisocyanates may be employed but are limited because of their high toxicity and the difficulty of employing these in polyurethane foam production. The diisocyanates are used in excess of the amount required to react with polyester. Usually from two to four equivalents in excess of polyester is employed for best results, the excess reacting with water to form carbon dioxide. The dicarboxylic acids may be used in a ratio of from about 5 to 50 mol. percent of itaconic acid and 50 to 95 mol. percent of the other dicarboxylic acid, based on total amount of dicarboxylic acid. The preferred dicarboxylic acids employed in this invention are saturated dicarboxylic acids which contain from 4 to 10 carbon atoms for example, acids such as succinic, adipic, pimelic, azelaic and sebacic acids. These acids may be used sigularly or in combination along with itaconic acid in the preparation of polyesters. The polyesters employed in the present compositions contain very reactive double bonds by virtue of the itaconic acid content. These double bonds are more reactive than those obtained by introducing other unsaturated polybacic acids such as maleic acid or anhydride, fumaric acid and citraconic acid or anhydride, in the polyester production.

The polyesters may be prepared by reacting the mixture of itaconic acid and a dicarboxylic acid such as adipic acid together with the glycol by heating from room temperature to about 210° to 250° C. at atmospheric pressure while the water formed by the esterification process is evolved until the esterification is substantially complete as indicated by a low acid number. The pressure is then reduced conveniently to from about 1 to 10 millimeters and heating is continued. The temperature is held at a maximum of about 210 to 250° C. while excess glycol is distilled from the mixture under vacuum until the polyesters have an average molecular weight from 1000 to 3000. Polyesters of higher molecular weight may be obtained by prolonged heating at higher temperature under reduced pressure as before. Because of the active double bonds in the itaconic acid, a small amount of an antioxidant is added to minimize polymerization of the itaconic acid. Naphthoquinone may be added in amounts sufficient for this purpose. Usually from 1 to 2 grams of naphthoquinone for every 500 grams of itaconic acid is added to the polyester reaction mixture. With other antioxidants varying amounts may be employed. The polyesters contain predominantly alcoholic hydroxyl terminal groups due to the employment of a slight excess of glycol. The hydroxyl content of the polyester may be determined after reaction of the polyester with excess acetic anhydride by titration of the acetic acid formed. This method is commonly employed in the art.

The polyurethane foam compositions are prepared from polyesters as produced by the above described method by reacting the polyesters with the organic diisocyanate by methods well known to the art. For example, a mixture of the polyester, water, the emulsifier, and a tertiary amine is thoroughly blended and the organic diisocyanate is added to the resultant emulsion with rapid stirring. The mixture begins to foam almost at once with the release of carbon dioxide and is immediately cast into a cavity or suitable mold. The foam is allowed to stand for a period of time to allow for complete reaction. It is preferred to allow the foam to stand for from 12 to 24 hours although this is not necessary. Actual cure is usually effected in a few hours. Alternatively, the foams may be subjected to elevated temperatures to effect rapid cure. For example, a temperature of about 50° C. may be employed for from 10 minutes to about four hours for this purpose. The foam may then be washed with water to destroy any excess diisocyanate. The resultant foam is substantially white and shows no discoloration after storage at room temperature for considerable lengths of time. For example, no appreciable discoloration is noted after 3 months. It is noteworthy that in commercially available polyurethane foams, discoloration is noticeable in about 1 day and continues to deepen gradually with time. The foams of this invention are found resistant to degradation by high humidity conditions. A number of accelerated tests may be employed to evaluate stability in humid air. A severe accelerated test for humidity stability involves heating the sample of polyurethane foam in an oven at 60° C. and 100% relative humidity for 60 days. Samples of polyurethane foams of this invention show enhanced stability under the conditions of this test in comparison with foams prepared according to the prior art. Further, the present foams exhibit a more uniform compression to load ratio than currently available polyurethane foams.

The following examples are given by way of illustration and are not to be construed as limitations of this invention many variations of which are possible within the scope and spirit thereof.

EXAMPLE I

A polyester containing 20 mol percent of itaconic acid and 80 mol percent of adipic acid was prepared from the following:

| | |
|---|---|
| Adipic acid _____g____ | 2336 |
| Itaconic acid _____g____ | 520 |
| Ethylene glycol _____ml___ | 1680 |
| 1,4-naphthoquinone _____g___ | 1.5 |

The mixture was heated under a nitrogen atmosphere, the temperature gradually being raised from 25° to about 216° C. over a period of 6 hours as water of esterification distilled off. Subsequently, the pressure was reduced to 2 millimeters of mercury and heating continued over an 8 hour period as excess glycol distilled off, leaving a residue of 3393 grams of a viscous syrup having a refractive index at 25° C. of 1.4810, 1.6% hydroxyl assay, and an equivalent weight of 1060.

EXAMPLE II

A polyester containing 30 mol. percent of itaconic acid and 70 mol. percent of adipic acid was prepared employing the procedure of Example I. The polyester had a refractive index of 1.4830 at 25° C., 1.3% hydroxyl assay, and an equivalent weight of 1300.

EXAMPLE III

A polyester containing 40 mol. percent of itaconic acid and 60 mol. percent of adipic acid was prepared employing the procedure of Example I. The polyester had a refractive index of 1.4862 at 25° C., 1.6% hydroxyl assay, and an equivalent weight of 1060.

EXAMPLE IV

A polyester containing 5 mol. percent of itaconic acid and 95 mol. percent of adipic acid was prepared employing the procedure of Example I. The polyester had a refractive index of 1.4760 at 25° C., 1.4% hydroxyl assay, and an equivalent weight of 1220.

EXAMPLE V

A polyester containing 50 mol. percent of itaconic acid and 50 mol. percent of adipic acid was prepared employing the procedure of Example I. The polyester had a refractive index of 1.4894 at 25° C., 1.6% hydroxyl assay and an equivalent weight of 1060.

EXAMPLE VI

A polyester containing 40 mol. percent of succinic acid and 60 mol. percent of adipic acid was prepared employing the procedure of Example I. It had a refractive index of 1.4772 at 25° C., 1.2% hydroxyl assay and an equivalent weight of 1220.

EXAMPLES VII TO XVIII

Flexible foams were prepared from the polyesters described in Examples I to VI. In addition, a commercially available adipic acid polyester having an equivalent weight of 1000 was employed. The method of preparing the foams is a standard, well-known procedure commonly employed in the art. The polyesters are thoroughly mixed with water, 0.3% by weight, based on the polyester, of an emulsifier (in this example, Emulphor EL-719, Antara, Division of General Aniline & Film) and from about 2% to 3% by weight, based on the weight of diisocyanate, of a tertiary amine (in this example, N-ethylmorpholine). If the polyester is waxy or too viscous, the mixture may be warmed gently to allow thorough blending. The resultant emulsion is then treated with a mixture of 80% of 2,4-tolylene diisocyanate and 20% of 2,6-tolylene diisocyanate, quickly stirred and immediately cast into a cavity. All foams were prepared at room temperature and allowed to stand for at least 12 hours. The ratios of tolylene diisocyanate and water employed are given in the following table.

Table I

| Polyester | Ratio A | Ratio B |
|---|---|---|
| (a) commercial polyester of adipic acid | 4 | 0.5 |
| (b) products of Example I | 4 | 1 |
| (c) products of Example I | 5 | 1 |
| (d) products of Example II | 4 | 0.5 |
| (e) products of Example II | 5 | 1 |
| (f) products of Example III | 4 | 0.5 |
| (g) products of Example III | 4 | 1 |
| (h) products of Example IV | 4 | 0.5 |
| (i) products of Example IV | 5 | 1 |
| (j) products of Example V | 4 | 0.5 |
| (k) products of Example V | 5 | 1 |
| (l) products of Example VI | 4 | 1 |

Ratio A = equivalents of isocyanate divided by equivalents of free polyester alcoholic hydroxyl groups.
Ratio B = equivalents of isocyanate minus equivalents of free polyester alcoholic hydroxyl groups, the whole divided by equivalents of water charged.

The foams "b" through "k" were white or slightly off-white and remained unchanged after 60 days in normal daylight.

EXAMPLE XIX

Samples of each foam as produced in Examples VII to XVIII were stored for 60 days at 60° C. and 100% relative humidity. At the conclusion of this test, foams "b" through "k" were still flexible and could be handled with no deterioration. Foams "a" and "l" however disintegrated to powder as soon as they were handled.

EXAMPLE XX

A polyester was prepared as in Example III employing an equivalent amount of sebacic acid in place of adipic acid with equivalent results. A foam was prepared as in Examples VII to XVIII. The foam had properties comparable with those of foams "b" through "k."

EXAMPLE XXI

A polyester was prepared as in Example I employing an equivalent amount of sebacic acid in place of adipic acid with equivalent results. The polyester had a refractive index of 1.4363 at 25° C., 2.7% hydroxyl assay and an equivalent weight of 630. Foams were prepared from this polyester as in Examples VII to XVIII and had properties comparable to foams "b" through "k."

EXAMPLE XXII

A polyester was prepared as in Example III, employing an equivalent amount of succinic acid in place of adipic acid. Foams were prepared from this polyester as in Examples VII to XVIII and had properties comparable to foams "b" through "k."

EXAMPLE XXIII

A polyester was prepared as in Example II employing an equivalent amount of a mixture of 20% of 1,2-propylene glycol and 80% of ethylene glycol in place of ethylene glycol with equivalent results. Foams were prepared from this ester and had properties comparable to foams "b" through "k."

EXAMPLE XXIV

A polyester was prepared as in Example I employing an equivalent amount of diethylene glycol in place of ethylene glycol with equivalent results. A foam prepared from this ester had properties comparable to foams "b" through "k."

EXAMPLE XXV

A polyester was prepared as in Example I employing an equivalent amount of a mixture of 50% ethylene glycol and 50% diethylene glycol in place of ethylene glycol with equivalent results. A foam prepared from this ester had properties comparable to foams "b" through "k."

What is claimed is:

1. Polyurethane foam compositions having improved color stability, improved resistance to degradation upon exposure to high humidity and improved compression-deflection behavior, comprising the reaction product of:
   (a) a polyester formed by substantially complete esterification of itaconic acid, at least one saturated dicarboxylic acid of from about four to ten carbon atoms and a slight excess of at least one glycol, said itaconic acid and dicarboxylic acid being present in a ratio of from about 5 to 50 mol. percent to about 50 to 95 mol. percent, based on total dicarboxylic acid present,
   (b) an organic diisocyanate, in an excess of about two to about four equivalents over that required to react with said polyester, and
   (c) water in a proportion of from about one to about two equivalents per equivalent of excess diisocyanate.

2. Polyurethane foam compositions as claimed in claim 1 wherein the glycol is ethylene glycol.

3. Polyurethane foam compositions as claimed in claim 1 wherein the dicarboxylic acid is adipic acid.

4. Polyurethane foam compositions as claimed in claim 1 wherein the glycol is diethylene glycol.

5. Polyurethane foam compositions as claimed in claim 1 wherein the dicarboxylic acid is sebacic acid.

6. A process of forming polyurethane foams having improved color stability, improved resistance to degradation upon exposure to high humidity and improved compression-deflection behavior, which process comprises reacting:
   (a) a polyester formed by substantially complete esterification of itaconic acid, at least one saturated dicarboxylic acid of from about four to ten carbon atoms and a slight excess of at least one glycol, said itaconic acid and dicarboxylic acid being present in a ratio of from about 5 to 50 mol. percent to about 50 to 95 mol percent, based on total dicarboxylic acid present,
   (b) an organic diisocyanate, in an excess of about two to about four equivalents over that required to react with said polyester, and
   (c) water in a proportion of from about one to about two equivalents per equivalent of excess diisocyanate.

References Cited in the file of this patent

UNITED STATES PATENTS

| | | |
|---|---|---|
| 2,690,987 | Jeffries et al. | Oct. 5, 1954 |
| 2,763,624 | Newell | Sept. 18, 1956 |
| 2,764,565 | Hoppe et al. | Sept. 25, 1956 |